Jan. 10, 1956 — H. R. ANSEL — 2,730,156
ANTISKID DEVICE
Filed July 5, 1952
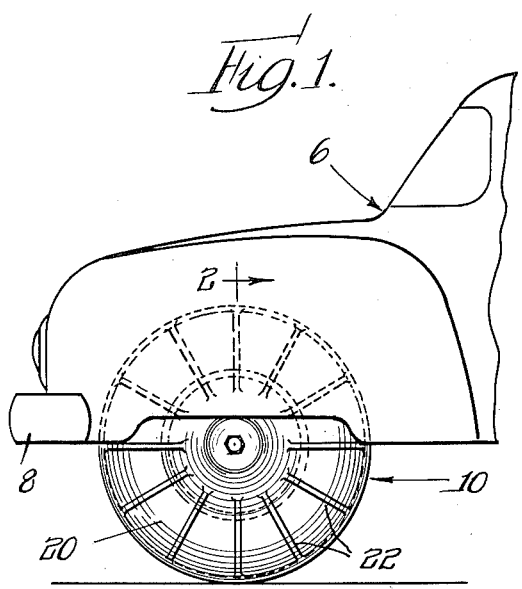
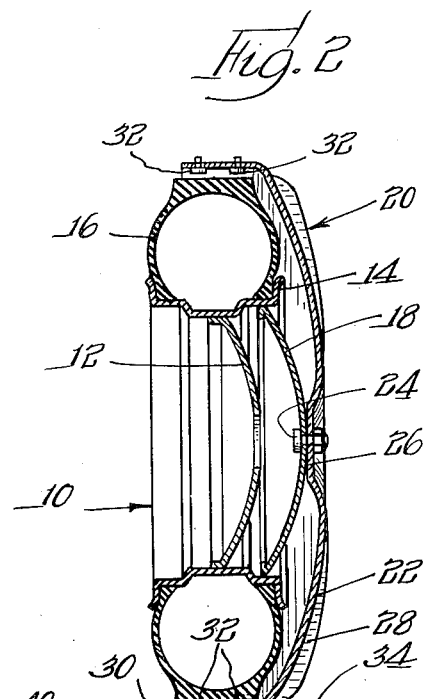
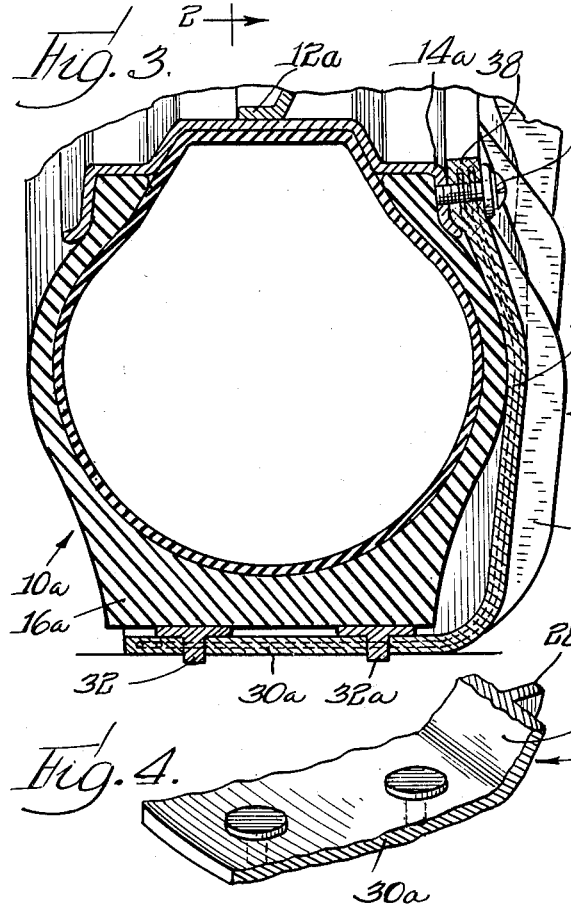
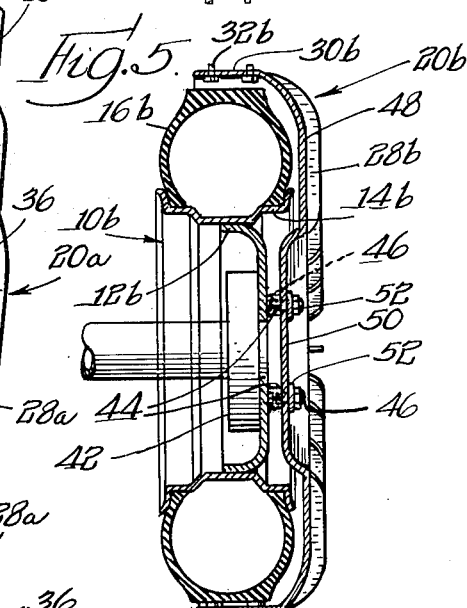
INVENTOR.
Harry R. Ansel
BY Moore, Olson & Trexler
attys.

2,730,156

ANTISKID DEVICE

Harry R. Ansel, Chicago, Ill.

Application July 5, 1952, Serial No. 297,269

11 Claims. (Cl. 152—185)

This invention is concerned with a non-skid device for automobiles and other vehicles.

Various tire treads have been devised to inhibit skidding of automotive vehicles on ice and snow. Studies have shown that while some such treads have been effective to improve traction and inhibit skidding on snow, they have not been very effective on ice. Only the well known tire chains have proven to be of much value on ice, and these have certain inherent defects. Either they are difficult to apply, or they are prone to come off. Links in cross chains often break, thus allowing the cross chains to flail the under side of the vehicle. If sharp edges are not provided by means such as reenforcing bars, antiskidding action is reduced, and if they are provided, they frequently become turned in use so as to bite into the tire, thus shortening the life of the tire. Tire chains furthermore cause a bumpy and unpleasant ride.

An object of this invention therefore is to provide an antiskidding device obviating the above noted defects.

A further object of this invention is to provide means for laying down and picking up antiskid elements beneath an automobile tire or the like.

More specifically, it is an object of this invention to provide an antiskid auxiliary tread for automotive and similar tires.

More particularly, it is an object of this invention to provide an auxiliary tread constructed of rubber having embedded antiskid elements.

A further object of this invention is to provide an auxiliary tread mountable without removing the wheel or even jacking up the vehicle.

Another object of this invention is to provide a device having means for improving traction of automotive vehicles on ice and hard-packed snow and means for improving traction in deep snow.

A further object of this invention is to provide an auxiliary tread having replaceable antiskid elements.

Other objects and advantages of the present invention will be apparent from the ensuing description wherein:

Fig. 1 is a fragmentary view of an automobile having an auxiliary tread constructed according to the principles of my invention;

Fig. 2 is a diametral sectional view through the wheel and tread as taken along the line 2—2 of Fig. 1;

Fig. 3 is an enlarged fragmentary view similar to Fig. 2 and showing a preferred form of auxiliary tread;

Fig. 4 is a fragmentary view in perspective of a portion of the auxiliary tread of Fig. 3; and Fig. 5 is a view similar to Fig. 2 showing another embodiment of my invention.

Referring first to the embodiment of Figs. 1 and 2, there will be seen the rear portion of the conventional automobile 6 having a rear bumper 8 and a rear wheel and tire assembly 10. The wheel and tire 10 as seen specifically in Fig. 2 include a wheel 12 of conventional construction including the rim 14. The usual pneumatic tire 16 is mounted on the wheel 12 and a hub cap 18 is snapped on the rim 14 in any desirable manner.

The wheel and tire assembly 10 is provided with an auxiliary tread 20 of rubber or the like including a concave-convex disc-like portion 22 secured to the hub cap by means such as a nut and bolt 24 passing through the hub cap and through the depressed central portion 26 of the disc-like portion 22. The disc-like portion 22 is provided with a plurality of radially disposed, angularly spaced fins 28. The fins 28 serve both to provide traction in deep, soft snow in paddle-like fashion, and also as stiffening ribs as will be apparent shortly.

A cylindrical flange or tread portion 30 is formed integral with the disc-like portion 22 and encircles the tire 16. The flange or tread portion 30 normally is slightly greater in diameter than is the tire 16 as may be seen at the top of Fig. 2. A plurality of pairs of T-shaped hard inserts of elements 32 is inserted in arcuately spaced relation through the tread portion 30 with the heads of the T-shaped hard inserts or elements 32 inside of the tread portion 30 and the shanks extending outwardly therefrom. The shanks may be sharpened or preferably are provided with square ends affording sharp edges so that as the wheel and tire assembly 10 rotates, the tire 16 will engage against the heads of the lowermost T-shaped hard elements 32 to force these elements to dig into ice and hard-packed snow to provide traction for the auxiliary tread 20. The auxiliary tread thus cannot slide relative to the ground or other traction surface 34, and the friction of the tire 16 against the inner side of the auxiliary tread portion 30 causes the auxiliary tread 20 to rotate with the wheel and tire assembly.

The inserts 32 conveniently may be made of metal, but other materials sufficiently hard to bite into ice and snow may be used instead. The inserts preferably are provided in pairs as described, but may be provided singly or in rows of more than two. It is preferred that the inserts be arcuately spaced sufficiently close together that at least one row is always in firm contact with an underlying plane surface but other spacing may be used as desired. The length of the inserts may be such that the shanks thereof extend approximately ⅛ inch from the periphery of the tread portion 30, although it will be understood that this figure can be varied and will vary with wear. Most conveniently, the heads of the inserts are flat and are positioned between the tread portion and the tire tread as shown, but it is contemplated that the heads might be of other enlarged configuration and might be embedded in the tread portion or the inserts may be formed without heads and suitably secured in the tread portion.

A preferred form of the invention is shown in Figs. 3 and 4. The wheel assembly 10a is similar to that previously described including the wheel 12a, rim 14a thereof, and tire 16a mounted thereon. The difference in this case resides in the auxiliary tread 20a which comprises a substantially ring-like side portion 36 having a thickened central bead 38 through which bolts 40 are passed and threaded into tapped apertures spaced about the rim 14a. The ring-like side portion 36 is provided with radially spaced fins 28a which serve both as snow cleats for deep snow and as stiffening ribs to keep the ring-like portion 36 and the tread portion 30a from flexing outwardly away from the tire 16a. It will be understood that the ring-like side portion 36, as well as the disc-like portion 22 of the embodiment shown in Fig. 2, possesses sufficient flexibility to allow the ring-like portion or disc-like portion to be bolted in place without having the lowermost part of the tread portion 30a or 30 beneath the tire 16. Therefore, it is unnecessary to jack up the wheel. The tread portion 30a or 30 then is flexed into position as the wheel rotates. As will be seen in the enlarged scale of Figs. 3 and 4, the heads and shanks of the T-shaped elements 32a are substantially circular. The heads are flat on top and are of relatively large diameter so that there is substantially no tendency for them to bite into the tire.

The construction shown in Fig. 3 provides for a positive drive of the auxiliary tread whereas that shown in Fig. 2 relies upon friction between the interior of the tread portion 30 and the tire 16. The advantages of positive drive have been used in a further modification as shown in Fig. 5 where again there is shown a conventional wheel assembly 10b having a wheel 12b and rim 14b carrying a tire 16b. The wheel 12b is held on the inner wheel 42 by nuts 44 threaded onto studs 46 extending outwardly through the wheel 12b from the inner wheel 42.

The auxiliary tread 20b is similar to those heretofore described having a cylindrical flange or tread portion 30b carrying T-shaped metal inserts or elements 32b. A ring-like section 48 having radially disposed fins 28b extends inwardly therefrom and is integrally connected to a central depressed disc 50. The disc 50 is provided with apertures receiving the studs 46, and nuts 52 are threaded on the outer ends of the studs to retain the auxiliary tread 20b in position. The nuts 52 may be of ornamental configuration if desired to present a pleasing appearance. The form of the invention shown in Fig. 5 has the desirable feature of requiring no modification of the hub cap or rim. All that is necessary is that the hub cap be removed.

The auxiliary tread may be molded with a non-skid outer tread which frictionally resists skidding. The major factor preventing skidding on ice and hard-packed snow, however, is the presence of the T-shaped metal inserts. While these inserts are desirable in that they can be replaced simply by prying the auxiliary tread away from the tire, removing the original insert and replacing it with a new one, it is contemplated that the outer tread portion could be filled with grit, sawdust, nutshells or other abrasive materials. The side portions of the auxiliary treads protect the regular tires, particularly white sidewall tires, from damage due to bumping curbs or other obstructions. It should be further understood that while a rubber composition is preferred as the chief material to use in constructing the auxiliary tread, it is within the scope of the invention to construct it of any desired material and to make it of a number of parts suitably secured together as well as in the preferred integral form.

In addition to the non-skid properties imparted by the antiskid inserted elements, improved traction is afforded in deep snow by the radial fins which additionally serve to hold the cylindrical flanges or tread portions in alignment with the tires, the entire auxiliary tread being preferable integrally molded of rubber. Although my auxiliary treads find their greatest utility on the rear driving wheels of an automobile, advantages in steering and braking are obtained by securing my auxiliary treads on the front wheels also. The auxiliary treads are comparatively quiet in operation and do not damage the tires already in place.

It will be understood that throughout the specification and claims wherever I used the word "rubber," the term comprehends rubber and similar substances, either reenforced as in tire casings, or not reenforced.

Although certain specific embodiments of my invention have been shown and described, it will be apparent that this is for purposes of illustration and not of limitation. The invention will be understood as including all that falls within the spirit and scope of the appended claims.

I claim:

1. An antiskid device for use on a vehicle wheel provided with a resilient tire comprising a rubber portion generally circular in cross section and adapted to encircle the vehicle wheel coaxially in juxtaposition to the generally cylindrical, supporting surface engaging section of the resilient tire, a plurality of relatively hard elements extending outwardly from the periphery of said rubber portion and adapted to bite into ice and snow on an underlying supporting surface, and a single radially inwardly extending flange having a plurality of arcuately spaced bolt holes for attaching said antiskid device to the rim of said wheel.

2. An antiskid device as claimed in claim 1, wherein the relatively hard elements comprise a plurality of inserts detachably mounted around said rubber portion.

3. An antiskid device as claimed in claim 1, wherein reenforcing fins extend along the flange between the said rubber portion and the bolt holes for stiffening the same.

4. An antiskid device for use on resilient tires of rimmed vehicle wheels, and comprising a peripherally continuous annular portion of relatively stiff rubber-like material to envelope the wear surface of the vehicle tire and terminating in a free inner edge portion permitting unencumbered axial application thereof to a tire when raised from the ground, said annular portion having projecting means extending outwardly from the ground engaging periphery thereof and adapted to bite into snow and ice on an underlying supporting surface, flange means attached to said annular portion and disposed around the outer edge of said annular portion and extending radially inwardly at least a distance permitting attachment thereof to a wheel rim, and fastener receiving aperture means adjacent the innermost portion of said flange means for attaching the same to a vehicle wheel.

5. An antiskid device as claimed in claim 4, wherein the projecting means on the annular portion comprise relatively hard elements extending outwardly from the ground engaging periphery thereof.

6. An antiskid device as claimed in claim 5, wherein the relatively hard elements comprise a plurality of detachably mounted inserts.

7. An antiskid device as claimed in claim 4, wherein the flange means is substantially peripherally continuous around the outer edge of said annular portion.

8. An antiskid device as claimed in claim 4, wherein the flange means is substantially peripherally continuous and is provided with radially extending fins disposed between the fastener receiving aperture means and the annular portion to provide stiffening for the annular portion and traction in heavy snow and the like.

9. An antiskid device as claimed in claim 4, wherein said annular portion and said flange means are relatively stiff to maintain the wheel-applied position of the device, but wherein the said annular portion and flange means are of sufficient resiliency to permit the application of a major portion of the device to a tire resting on the ground with the remaining portion of the device adapted for flexing and complete application to the tire upon slight rotation thereof along the ground.

10. An antiskid device as claimed in claim 4, wherein the flange means includes a central disc portion with a central bolt hole adapted for attachment to the hub cap of the vehicle wheel, and wherein the projecting means comprises relatively hard inserts also projecting to the interior of said annular portion for increased traction with the vehicle tire.

11. An antiskid device as claimed in claim 4, wherein the flange means includes a central disc portion inwardly offset and provided with a plurality of apertures adapted to receive mounting studs of the vehicle wheel for mounting the antiskid device thereon.

References Cited in the file of this patent

UNITED STATES PATENTS

| | | |
|---|---|---|
| 753,285 | Maxim | Mar. 1, 1904 |
| 1,753,519 | Kanner | Apr. 8, 1930 |
| 1,884,330 | Stabili | Oct. 25, 1932 |
| 1,908,808 | Auciunas | May 16, 1933 |
| 2,185,017 | Purvis | Dec. 26, 1939 |
| 2,480,548 | Carhart | Aug. 30, 1949 |
| 2,535,299 | Leach | Dec. 26, 1950 |
| 2,601,882 | Eisenhauer | July 1, 1952 |

FOREIGN PATENTS

| | | |
|---|---|---|
| 367,057 | Italy | Jan. 19, 1939 |